Feb. 15, 1927.
M. KUNDRAT
SLEIGH
Filed May 24, 1926
1,617,529
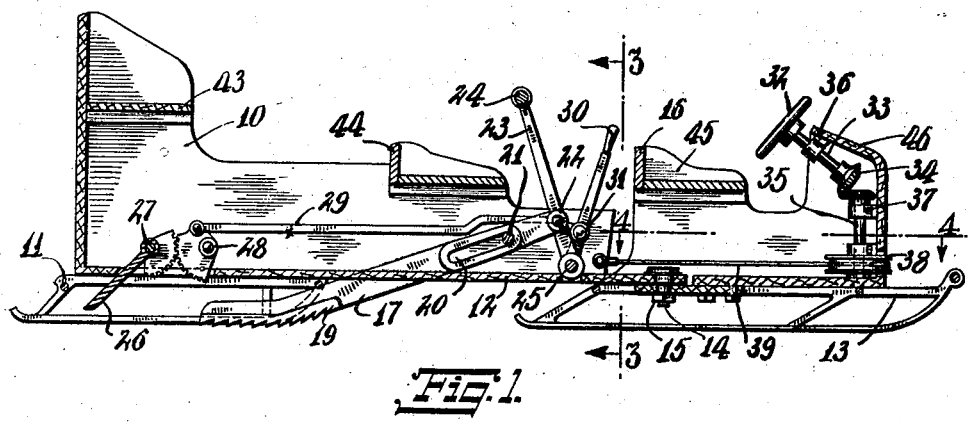
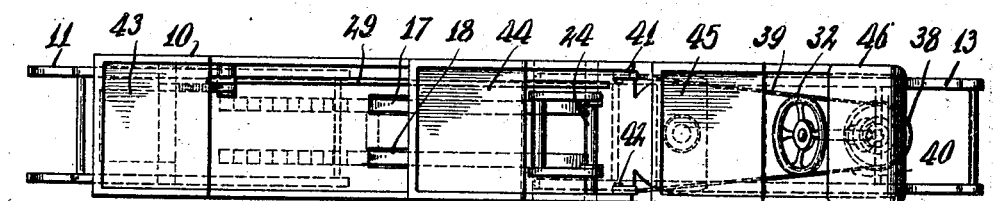
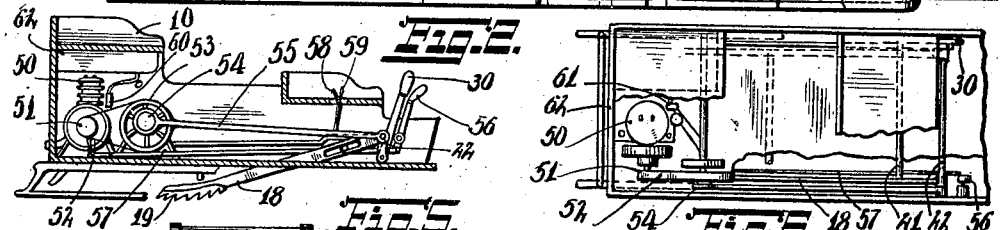
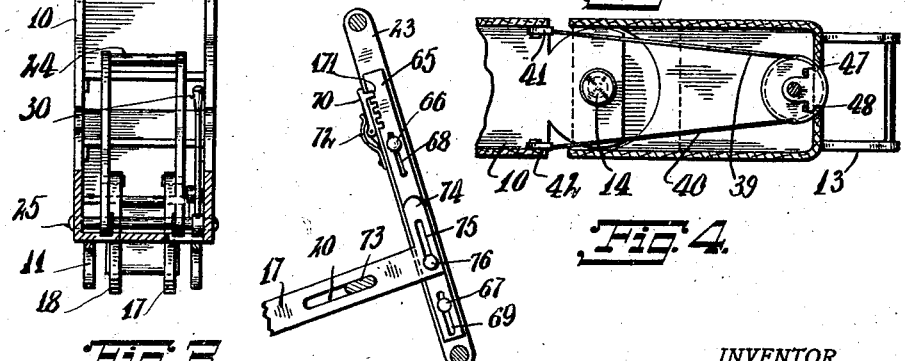
INVENTOR
Michael Kundrat
BY
ATTORNEY Patented Feb. 15, 1927.

1,617,529

UNITED STATES PATENT OFFICE.

MICHAEL KUNDRAT, OF HAFFEY, PENNSYLVANIA.

SLEIGH.

Application filed May 24, 1926. Serial No. 111,102.

This invention relates to a propellable sleigh, of the type usually referred to as a bob-sleigh, and its principal object is to provide a device of this character having means to impart motion thereto.

A further object is the provision of a novel steering mechanism and adequate braking apparatus.

The sleigh is built on practical lines and will be found both sturdy and reliable in use.

The aforementioned objects, together with other features and advantages will be fully described in the following specification, and illustrated in the accompanying drawings, in which:

Fig. 1 shows a side elevation of the sled in section.

Fig. 2 shows a plan view.

Fig. 3 shows a sectional view on the line 3—3 of Fig. 1.

Fig. 4 shows a plan sectional view of the forward sled, on the line 4—4 of Fig. 1.

Fig. 5 shows on a reduced scale, a side view of the main body structure with motor driving mechanism installed therein, the side of the body being removed to disclose the said mechanism.

Fig. 6 shows a plan view of the apparatus shown in Fig. 5; portions of the seats and floor being broken away.

Fig. 7 shows a modified form of rocking lever with means to adjust the range of oscillating movement.

Referring first to Fig. 1 of the drawings; the sleigh is constructed as follows:

A main body 10 is supported on a sled 11 and has its lower frame element 12 extended forward beyond the said main body structure. Pivotally secured to the said forward extension is a steering sled 13. This is connected by means of the bolt 14 and the nut 15. An auxiliary body 16 is mounted on the said steering sled.

A propelling mechanism is built into the main body and is of the following construction: Propellers as shown at 17 and as seen at 17 and 18 in Figure 2 having rear extending toothed members as that shown at 19, are provided with slotted portions as that shown at 20, which are adapted to slide on a supporting bar 21. At their upper extremities, these propellers are pivotally attached as shown at 22 to rocking levers as that shown at 23; there being two of these connected by the hand bar 24. These levers are mounted on the shaft 25 which is secured to the sides of the main body.

A brake shoe 26 is mounted on the stud 27 and has a toothed segment engaging an adjacent segment which is mounted on the stud 28 and pivotally attached to the brake rod 29 which is in turn secured to the lever 30 by the pivot 31.

A novel steering element is provided on the forward sled and comprises a hand wheel 32, a shaft 33 and a bevel gear 34 which engages another bevel gear attached to a vertical shaft 35. The hand wheel shaft is supported by the lug 36, and the vertical shaft by the lug 37, and is further supported by insertion in a socket on the sled frame. Keyed to the vertical shaft is a drum 38, and secured to this drum are cables as seen at 39 in Figure 1 and at 39 and 40 in Figure 2. These cables are attached at their rear ends to the frame of the main body as shown at 41 and 42 in Figure 2.

Seats 43, 44 and 45 are provided as illustrated herewith, and a curved dash 46 serves to protect the steersman from flying snow, or the like, as well as forming a supporting element for members of the steering apparatus.

The arrangement of the steering cables 39 and 40 and their attachment to the drum by the pins 47 and 48 is clearly shown in Figure 4 of the drawings.

The sleigh as above described, is operated as follows:

A propeller man is seated in the forward seat 44 of the main body and a steersman in the seat 45 of the steering sled. The propeller man grasps the bar 24 and pulls same backward. This causes the propellers to slide back at a downward angle and to grip the snow, or ice with the teeth as shown at 19, and the continued pressure drives the sleigh forward. The bar 24 is pushed forward and again drawn back in the same manner as before. This repeated action propels the sleigh in a forward direction.

When necessary to check the speed, as in going down hill, the brake shoe 26 is forced downward by a backward pull on the lever 30.

The steersman guides the sleigh by turning the hand wheel, which, acting through the bevel gears turns the drum. This causes a tension on one cable and a corresponding relaxation of the other and draws the forward part of the steering sled over to the side of the tight cable. This, in greater, or less degree changes the course of the sleigh as desired.

In Figures 5 and 6 I have shown an arrangement of the invention in which the rocking levers are actuated by a motor driving mechanism instead of the hand bar.

In this arrangement; a motor of suitable design 50 is mounted in the main body and is connected by means of the pulley 51 and the belt 52 to a drive wheel 53. This drive wheel is provided with an eccentric 54 on which is mounted the connecting rod 55 which, at its forward end is secured by a suitable bearing member to the shaft 22. The engine clutch is controlled by the lever 56 which has suitable means for locking in position. This lever is connected to the clutch by the rod 57. Spark and throttle levers are shown at 58 and 59; their connection being by sliding wires of the form used in motor cycle construction and the like. The carburettor and magneto are shown at 60 and 61, and the gasoline tank at 62.

The action of this driving mechanism is similar to that of the first described, except that the connecting rod actuates the propeller levers.

In Fig. 7, I have shown a modified form of rocking lever in which the range of movement may be adjusted to suit varied requirements.

In this form, the lever 23 has slidably attached thereto the bar 65 which is retained by the studs 66 and 67 which are affixed to the said lever 23. Slots 68 and 69 permit this bar to slide up and down when released by lifting the latch 70 which engages the toothed portion of the bar as shown at 71. A spring 72 holds the latch in its closed position. The propeller 17 is slotted at 20 as shown in the preceding views, but is supported by a transverse bar 73 which is flat in section and guides the propeller on a positive axis. The propeller as so used in this form is provided with an L member 74 which is slotted as shown at 75 and engages the stud 76 on which it is free to move as required.

While I have shown the preferred forms of the invention I do not wish to be limited to the exact construction as illustrated, but claim the right to such minor modifications as may come within the scope of the appended claims.

Having thus described my invention, what I claim as new and desire to secure by Letters Patent, is as follows:

1. In a sleigh, a body structure comprising pivotally connected rearward and forward sections, a front and rear seat in said respective sections, means controllable by the occupant of said forward seat for guiding the direction of the movement of said sleigh, a lever pivotally mounted on said body operable by the occupant of said rearward seat, a slidable rod pivoted at one end to said lever, the lower portion of said rod being curved to render the end portion thereof substantially parallel to the longitudinal axis of said rearward body section, and a plurality of teeth on said end portion adapted to dig into the surface upon which said sleigh rests to retain said rod substantially fixed while urging said sleigh forward.

2. In a sleigh, a body structure mounted on runners, a shaft disposed laterally of and rotatively mounted in said body structure, rocking lever journaled at one end on said shaft, a handle member joining said rocking member at the upper end thereof, rods slidably mounted on said body structure and pivotally attached to said levers intermediate the ends thereof, the lower portion of said rods being curved, and teeth on the lowermost edge of said curved portion adapted to engage the ice and snow upon which said sleigh is supported, said teeth being adapted to individually and successively dig into said ice and snow when the rods are forced rearwardly by movement of said levers.

In testimony whereof I have affixed my signature.

MICHAEL KUNDRAT.